(No Model.)
G. HAVELL.
SNAP HOOK.
No. 295,390. Patented Mar. 18, 1884.
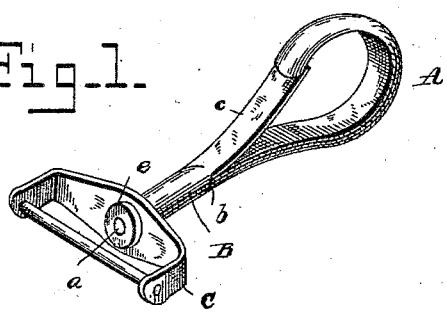
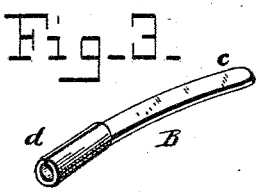
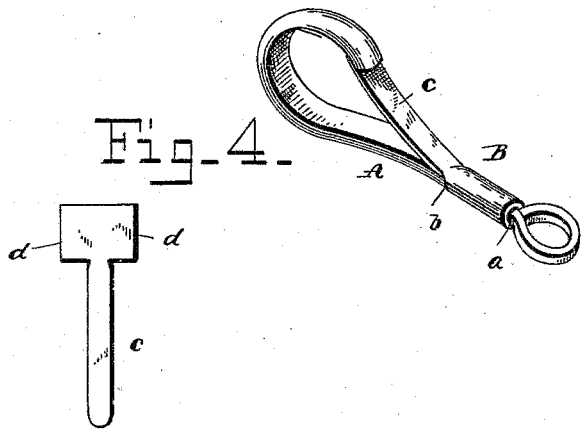
WITNESSES
E. L. Yewell.
J. J. McCarthy
INVENTOR
George Havell
By R. M. Alexander,
Attorney

UNITED STATES PATENT OFFICE.

GEORGE HAVELL, OF NEWARK, NEW JERSEY.

SNAP-HOOK.

SPECIFICATION forming part of Letters Patent No. 295,390, dated March 18, 1884.

Application filed October 10, 1883. (No model.)

*To all whom it may concern:*

Be it known that I, GEORGE HAVELL, a citizen of the United States, residing at Newark, in the county of Essex and State of New Jersey, have invented certain new and useful Improvements in Snap-Hooks and Snap-Hook Swivels, of which the following is a specification, reference being had therein to the accompanying drawings.

This invention relates to certain improvements in snap-hooks; and it has for its objects to provide a light, cheap, and ornamental article, as more fully hereinafter specified. These objects I attain by the means illustrated in the accompanying drawings, in which—

Figure 1 represents a perspective view of my improved snap-hook; Fig. 2, a similar view of a modification of the same; Fig. 3, a detached view of the spring of the snap-hook, and Fig. 4 a detached view of the blank of which the spring is formed.

The letter A indicates a hook, which is constructed of a half-round metallic wire, bent into proper shape, and provided with a shank, $a$, and shoulders $b$ at the rear.

The letter B indicates a metallic leaf-spring consisting of a tongue, $c$, having ears $d$ at the rear, which are bent so as to form a tubular socket, as clearly shown in Fig. 3 of the drawings. The socket thus formed fits over the shank of the hook, its forward edge setting against the shoulders on said hook, the forward end of the tongue setting under the end of the hook, as shown in Figs. 1 and 2 of the drawings. The socket is of such length as to permit the end of the shank to project, and to said projecting end is secured a swiveled loop, C, by means of a washer, $e$, which is fastened to the shank by riveting the end of the shank. It will be seen that the socket forms a shoulder for the swiveled loop, while said attachment serves to hold the spring in place.

In the modification shown in Fig. 2, the swivel is dispensed with and the spring is confined by forming a loop at the end of the shank.

Having thus described my invention, what I claim, and desire to secure by Letters Patent, is—

1. A snap-hook consisting of a bar bent into a hook at one end and a loop at the other, having a shoulder near the loop, and a leaf-spring, the free end of which lies normally under the end of the hook, while the other end is provided with wings, which are bent around the bar between the shoulder and the loop for securing said spring in place, substantially as described.

2. The combination with the hook having a shouldered shank, of the leaf-spring formed with a socket to fit upon the shank, and the swiveled loop secured to the end of the shank and bearing against the end of the socket, substantially as and for the purposes specified.

In testimony whereof I affix my signature in presence of two witnesses.

GEORGE HAVELL.

Witnesses:
   J. D. CLARK,
   A. VAN ARSDALE.